(12) United States Patent
Watanabe

(10) Patent No.: US 6,441,877 B1
(45) Date of Patent: Aug. 27, 2002

(54) ACTIVE MATRIX TYPE LIQUID CRYSTAL DISPLAY DEVICE AND METHOD OF FORMING THE SAME

(75) Inventor: Takahiko Watanabe, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/413,535

(22) Filed: Oct. 6, 1999

(30) Foreign Application Priority Data

Oct. 7, 1998 (JP) ............................................ 10-284648

(51) Int. Cl.[7] ........................ G02F 1/136; G02F 1/1333
(52) U.S. Cl. ........................................ 349/138; 349/43
(58) Field of Search ............................ 349/43, 138, 42, 349/178, 143

(56) References Cited

U.S. PATENT DOCUMENTS

| | | | | |
|---|---|---|---|---|
| 4,490,015 A | * | 12/1984 | Kawarada et al. | 349/178 |
| 5,905,548 A | * | 5/1999 | Shimada | 349/43 |
| 5,946,065 A | * | 8/1999 | Tagusa et al. | 349/138 |
| 6,128,060 A | * | 10/2000 | Shimada et al. | 349/138 |
| 6,141,077 A | * | 10/2000 | Hirata et al. | 349/143 |

FOREIGN PATENT DOCUMENTS

| | | |
|---|---|---|
| JP | 56-91217 | 7/1981 |
| JP | 6-101714 | 4/1991 |
| JP | 6-293639 | 12/1991 |
| JP | 5-181150 | 7/1993 |
| JP | 5-196950 | 8/1993 |
| JP | 6-130405 | 5/1994 |
| JP | 6-138469 | 5/1994 |
| JP | 6-194656 | 7/1994 |
| JP | 6-194657 | 7/1994 |
| JP | 7-146485 | 6/1995 |
| JP | 7-175088 | 7/1995 |
| JP | 8-160442 | 6/1996 |
| JP | 9-105925 | 4/1997 |
| JP | 10-26765 | 1/1998 |
| JP | 10-142619 | 5/1998 |

OTHER PUBLICATIONS

Japanese Office Action dated Apr. 17, 2001 with partial English translation.
Japanese Office Action, dated Jul. 11, 2000, with partial English translation.

* cited by examiner

Primary Examiner—Toan Ton
(74) Attorney, Agent, or Firm—McGinn & Gibb, PLLC

(57) ABSTRACT

In a display device, electrodes of both an opposing-side substrate and a TFT-side substrate are made of transparent metals to improve the display device in light transmission rate. The display device operates in the same manner as that of a so-called In-Plate Switching type of liquid crystal display device. Sandwiched between the substrates is a liquid crystal having a negative dielectric anisotropy. A transparent electrode is formed on an opposing surface of the opposing-side substrate to face the TFT-side substrate. Pixel electrode portions and an interlayer insulation film are formed on an opposing surface of the TFT-side substrate to face the opposing-side substrate. The interlayer insulation film has its slits aligned in position with the pixel electrode portions.

14 Claims, 9 Drawing Sheets

ACTIVE MATRIX TYPE LIQUID CRYSTAL DISPLAY DEVICE AND METHOD OF FORMING THE SAME

BACKGROUND OF THE INVENTION

1. Field of the Invention

The present invention relates to an active matrix type liquid crystal display device and a method of forming the same, and more particularly to the active matrix type liquid crystal display device in construction, and to its electrodes for controlling a liquid crystal of the active matrix type liquid crystal display device.

2. Description of the Related Art

Figure 12:
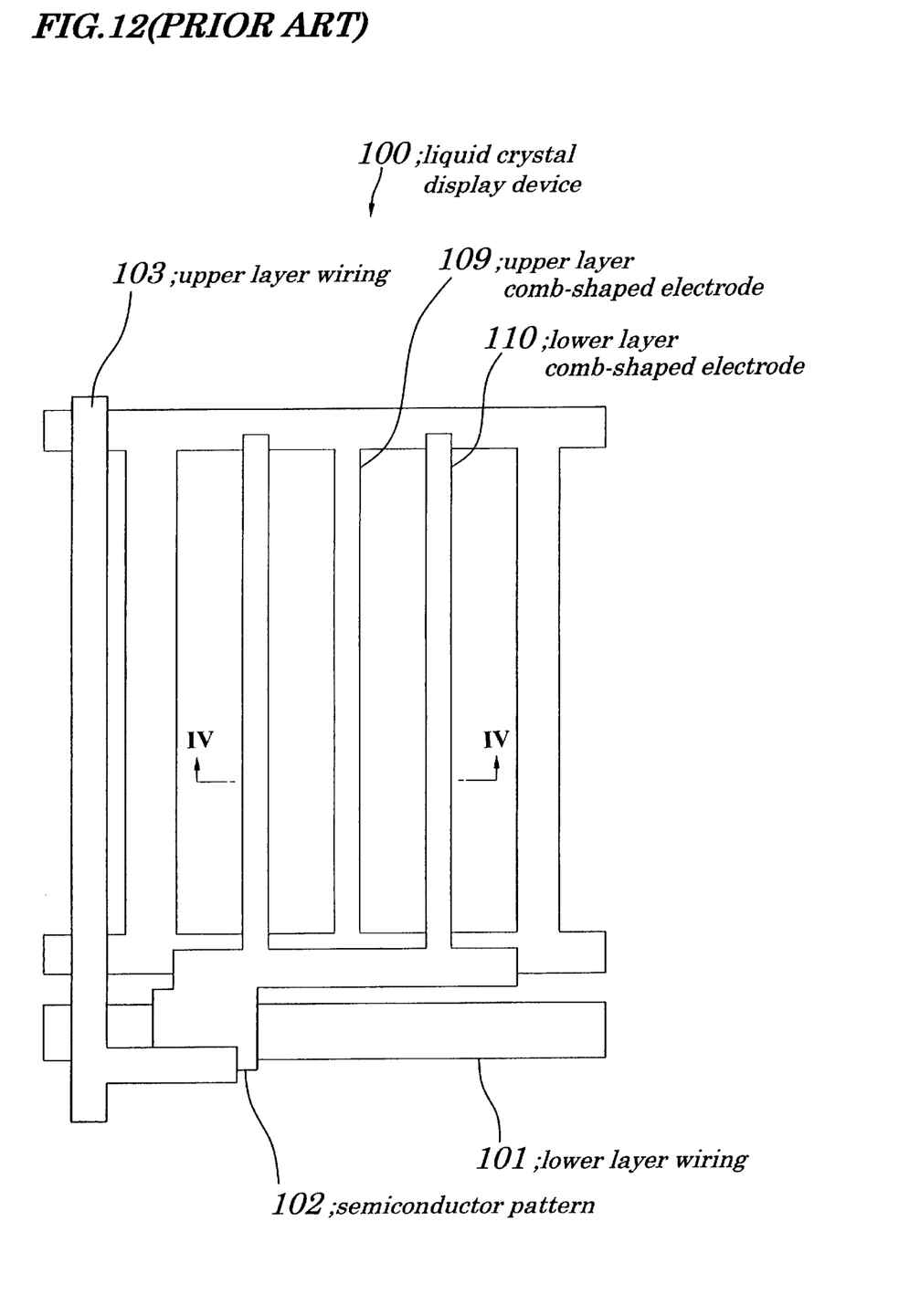
FIG. 12 is a plan view of the conventional IPS type liquid crystal display device.
Figure 13:
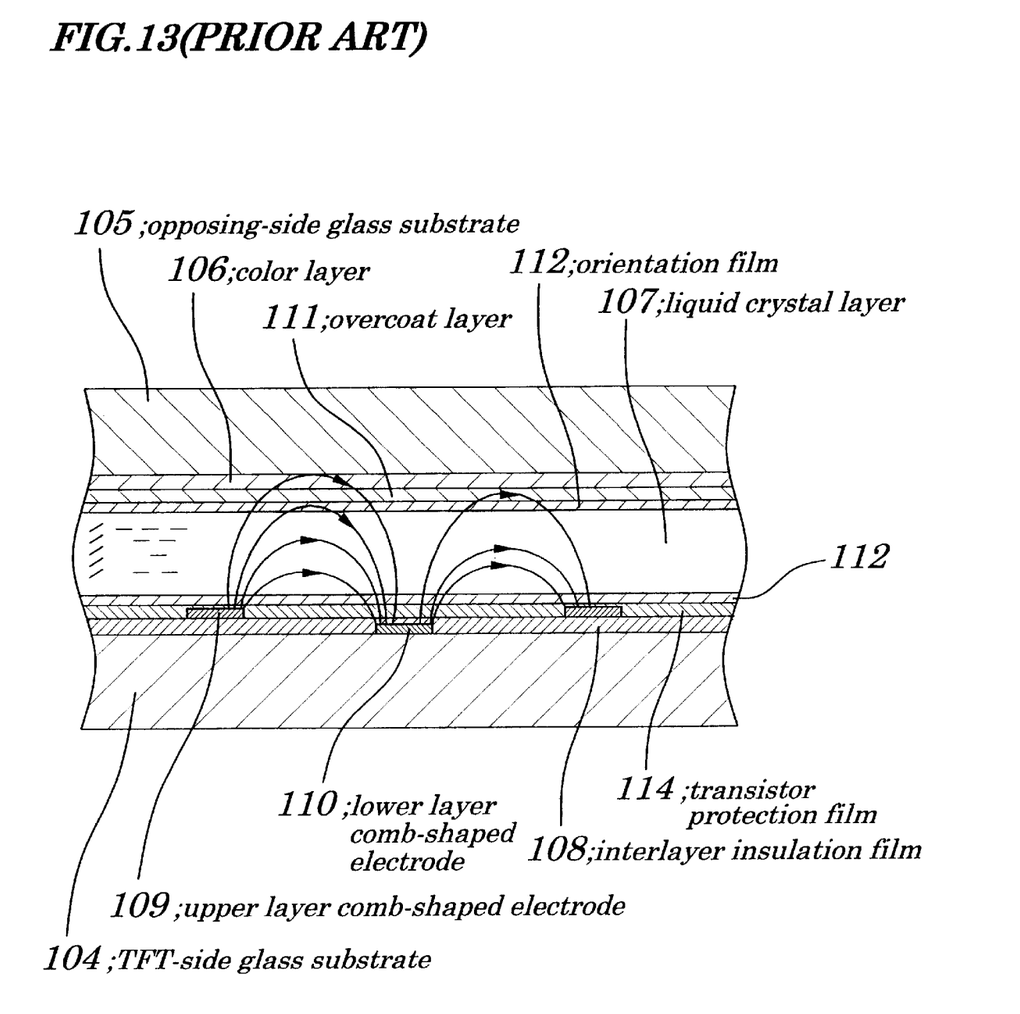
FIG. 13 is a cross-sectional view of the conventional liquid crystal display device, taken along the line IV—IV of FIG. 12.

Heretofore, liquid crystal display devices of a so-called "In-Plate Switching (i.e., IPS)" type have been proposed. FIG. 12 shows a plan view of a conventional liquid crystal display device. FIG. 13 shows a cross-sectional view of the conventional liquid crystal display device, taken along the line IV—IV of FIG. 12.

In a conventional liquid crystal display device 100 of the above-mentioned IPS type shown in FIGS. 12 and 13, a liquid crystal layer 107 is sandwiched between a pair of transparent glass substrates, which comprise: an opposing-side glass substrate 105; and, a thin-film-transistor-side (i.e., TFT-side) glass substrate 104 oppositely disposed from the opposing-side glass substrate 105.

Formed on the TFT-side glass substrate 104 are: a lower layer wiring 101; a lower layer comb-shaped electrode 110, wherein both the lower layer wiring 101 and the lower layer comb-shaped electrode 110 are made of non-transparent metals such as Cr, Al, Mo, etc.; an interlayer insulation film 108; and, a semiconductor layer, wherein both the interlayer insulation film 108 and the semiconductor layer are formed by a plasma enhanced CVD process (hereinafter referred to as the P-CVD process). After that, a semiconductor pattern 102 is formed by a photo resist process (hereinafter referred to as the PR process). Both an upper layer wiring 103 and an upper layer comb-shaped electrode 109 are made of the same material as that of the lower layer wiring 101. After completion of a channel etching process, a transistor protection film 114 is formed. The transistor is hereinafter referred to as Tr.

On the other hand, in the side on the opposing-side glass substrate 105, as is clear from FIG. 13, a color layer 106 is applied to the opposing-side substrate 105. Then, acrylic resins are applied to the entire surface of the opposing-side glass substrate 105 to form an overcoat layer 111, which prevents any substance issued from the color layer 106 from entering and affecting the liquid crystal layer 107 in characteristic. Then, an orientation film 112 is applied to each of the opposing-side substrates 105 and the TFT-side substrate 104. The thus applied orientation film 112 is then subjected to an orientation treatment, which is followed by formation of the liquid crystal layer 107 of a liquid crystal filled in a panel gap between the TFT-side glass substrate 104 and the opposing-side glass substrate 105.

In the so-called IPS type of liquid crystal display device having the above construction, an electric field is produced between the upper layer comb-shaped electrode 109 and the lower layer comb-shaped electrode 110 to form a lateral electric field therebetween, wherein: through the thus formed lateral electric field, the liquid crystal is controlled in operation.

In the conventional IPS type liquid crystal display device having the above construction, since its electrode for producing the lateral electric field is not transparent, the display device is poor in light transmission rate. Further, in an area of the conventional display device in which area the opposing-side electrode is brought into contact with the liquid crystal layer, it is not possible to form a transparent electrode made of a transparent metal such as ITO (i.e., Indium Tin Oxide), etc., because it is necessary to prevent the lateral electric field of the liquid crystal layer from being disturbed. Since the metal electrode excellent in barrier properties can't be used as described above, in order to prevent any substance issued from the color layer 106 from entering the liquid crystal layer 107, it is necessary to apply the overcoat layer 111 to the entire surface of the opposing-side glass substrate 105.

Further, in the conventional display device, since no conductive element for shielding the electric field (i.e., inner electric field) produced in the liquid crystal layer 107 is formed in the opposing-side glass substrate 105, it is necessary to shield such inner electric field from any external electric field by means of a suitable shield means such as: a transparent conductive film formed in a rear surface of the substrate so as to prevent the conductive film from affecting the inner electric field; a conductive polarizing plate; or, like elements. As described above, the conventional display device suffers from various disadvantages.

SUMMARY OF THE INVENTION

In view of the above, it is an object of the present invention to provide an active matrix type liquid crystal display device and a method of forming the same, wherein:

electrodes in each of an opposing-side substrate and a TFT-side substrate are made of a transparent metal to improve the display device in light transmission rate; and, the display device may operate in substantially the same manner as that of the so-called IPS type liquid crystal display device.

According to a first aspect of the present invention, there is provided an active matrix type liquid crystal display device having:

a TFT-side substrate;

an opposing-side substrate oppositely disposed from the TFT-side substrate;

a liquid crystal sandwiched between the TFT-side substrate and the opposing-side substrate;

a transparent conductive electrode formed on an opposing surface of the opposing-side substrate, wherein the opposing surface of the opposing-side substrate faces the TFT-side substrate;

a pixel electrode provided with a plurality of pixel electrode portions formed on an opposing surface of the TFT-side substrate, wherein the opposing surface of the TFT-side substrate faces the opposing-side substrate; and an interlayer insulation film provided with a plurality of slits each aligned in position with each of the pixel electrode portions, wherein the liquid crystal has a negative dielectric anisotropy.

According to a second aspect of the present invention, there is provided an active matrix type liquid crystal display device having:

a TFT-side substrate;

an opposing-side substrate oppositely disposed from the TFT-side substrate;

a liquid crystal sandwiched between the TFT-side substrate and the opposing-side substrate;

a transparent conductive electrode formed on an opposing surface of the opposing-side substrate, wherein the opposing surface of the opposing-side substrate faces the TFT-side substrate;

a pixel electrode provided with a plurality of pixel electrode portions formed on an opposing surface of the TFT-side substrate, wherein the opposing surface of the TFT-side substrate faces the opposing-side substrate, and the pixel electrode portions each having an electrode width are spaced apart from each other at predetermined electrode spacings; and an interlayer insulation film provided with a plurality of slits each aligned in position with each of the pixel electrode portions, wherein the liquid crystal has a negative dielectric anisotropy.

In the active matrix type liquid crystal display device according to the second aspect of the present invention, preferably:

$$W<d$$

where W is an electrode width of each of the pixel electrode portions; and, d is a panel gap between the opposing-side substrate and the TFT-side substrate. Further, preferably:

$$d<S<3d$$

where S is each of the electrode spacings of the pixel electrode portions; and, d is the panel gap between the opposing-side substrate and the TFT-side substrate.

According to a third aspect of the present invention, there is provided an active matrix type liquid crystal display device having:

a TFT-side substrate;

an opposing-side substrate oppositely disposed from the TFT-side substrate;

a liquid crystal sandwiched between the TFT-side substrate and the opposing-side substrate;

a transparent conductive electrode formed on an opposing surface of the opposing-side substrate, wherein the opposing surface of the opposing-side substrate faces the TFT-side substrate;

an interlayer insulation film provided with a plurality of slits, the interlayer insulation film being formed on an opposing surface of the TFT-side substrate, wherein the opposing surface of the TFT-side substrate faces the opposing-side substrate; and a pixel electrode provided with a plurality of pixel electrode portions each capable of being embedded in each of the slits of the interlayer insulation film, wherein the liquid crystal has a negative dielectric anisotropy.

According to a fourth aspect of the present invention, there is provided a method of forming an active matrix type liquid crystal display device, having the steps of:

sandwiching a liquid crystal between a TFT-side substrate and an opposing-side substrate which is oppositely disposed from the TFT-side substrate;

forming a transparent conductive electrode on an opposing surface of the opposing-side substrate, wherein the opposing surface of the opposing-side substrate faces the TFT-side substrate; and forming both a pixel electrode having a plurality of pixel electrode portions and an interlayer insulation film on an opposing surface of the TFT-side substrate, wherein the opposing surface of the TFT-side substrate faces the opposing-side substrate, the interlayer insulation film being provided with a plurality of stepped slits each aligned in position with each of the pixel electrode portions, wherein the liquid crystal has a negative dielectric anisotropy.

According to a fifth aspect of the present invention, there is provided a method of forming an active matrix type liquid crystal display device, having the steps of:

sandwiching a liquid crystal between a TFT-side substrate and an opposing-side substrate which is oppositely disposed from the TFT-side substrate;

forming a transparent conductive electrode on an opposing surface of the opposing-side substrate, wherein the opposing surface of the opposing-side substrate faces the TFT-side substrate;

forming both a pixel electrode with a plurality of pixel electrode portions and an interlayer insulation film on an opposing surface of the TFT-side substrate, wherein the opposing surface of the TFT-side substrate faces the opposing-side substrate, and the pixel electrode portions each having an electrode width are spaced apart from each other at predetermined electrode spacings to form a pixel electrode slit between adjacent ones of the pixel electrode portions, and the interlayer insulation film is provided with a plurality of stepped slits each aligned in position with each of the pixel electrode portions, wherein the liquid crystal has a negative dielectric anisotropy.

According to a sixth aspect of the present invention, there is provided a method of forming an active matrix type liquid crystal display device, having the steps of:

sandwiching a liquid crystal between a TFT-side substrate and an opposing-side substrate which is oppositely disposed from the TFT-side substrate;

forming a transparent conductive electrode on an opposing surface of the opposing-side substrate, wherein the opposing surface of the opposing-side substrate faces the TFT-side substrate; and forming both a pixel electrode having a plurality of pixel electrode portions and an interlayer insulation film on an opposing surface of the TFT-side substrate, wherein:

the opposing surface of the TFT-side substrate faces the opposing-side substrate; the interlayer insulation film is provided with a plurality of interlayer insulation film slits; and, each of the pixel electrode portions is capable of being embedded in each of the interlayer insulation film slits, wherein the liquid crystal has a negative dielectric anisotropy.

In the method of forming the active matrix type liquid crystal display device according to the present invention, preferably:

the pixel electrode portions are made of a transparent metal capable of permitting light to pass therethrough.

In the present invention having the above construction, it is possible for the pixel electrode portions to permit the light to pass therethrough since the electrodes formed on both the opposing-side substrate and the TFT-side substrate are made of the transparent metal, which improves the display device of the present invention in light transmission rate in comparison with the conventional display device in which non-transparent electrodes are used. Further, in the display device of the present invention having the above construction, it is possible to control the liquid crystal by using the lateral electric field.

BRIEF DESCRIPTION OF THE DRAWINGS

The above and other objects, advantages and features of the present invention will be more apparent from the following description taken in conjunction with the accompanying drawings in which.

DETAILED DESCRIPTION OF THE PREFERRED EMBODIMENTS

The best modes for carrying out the present invention will be described in detail using embodiments of the present invention with reference to the accompanying drawings.

FIRST EMBODIMENT

Figure 1:
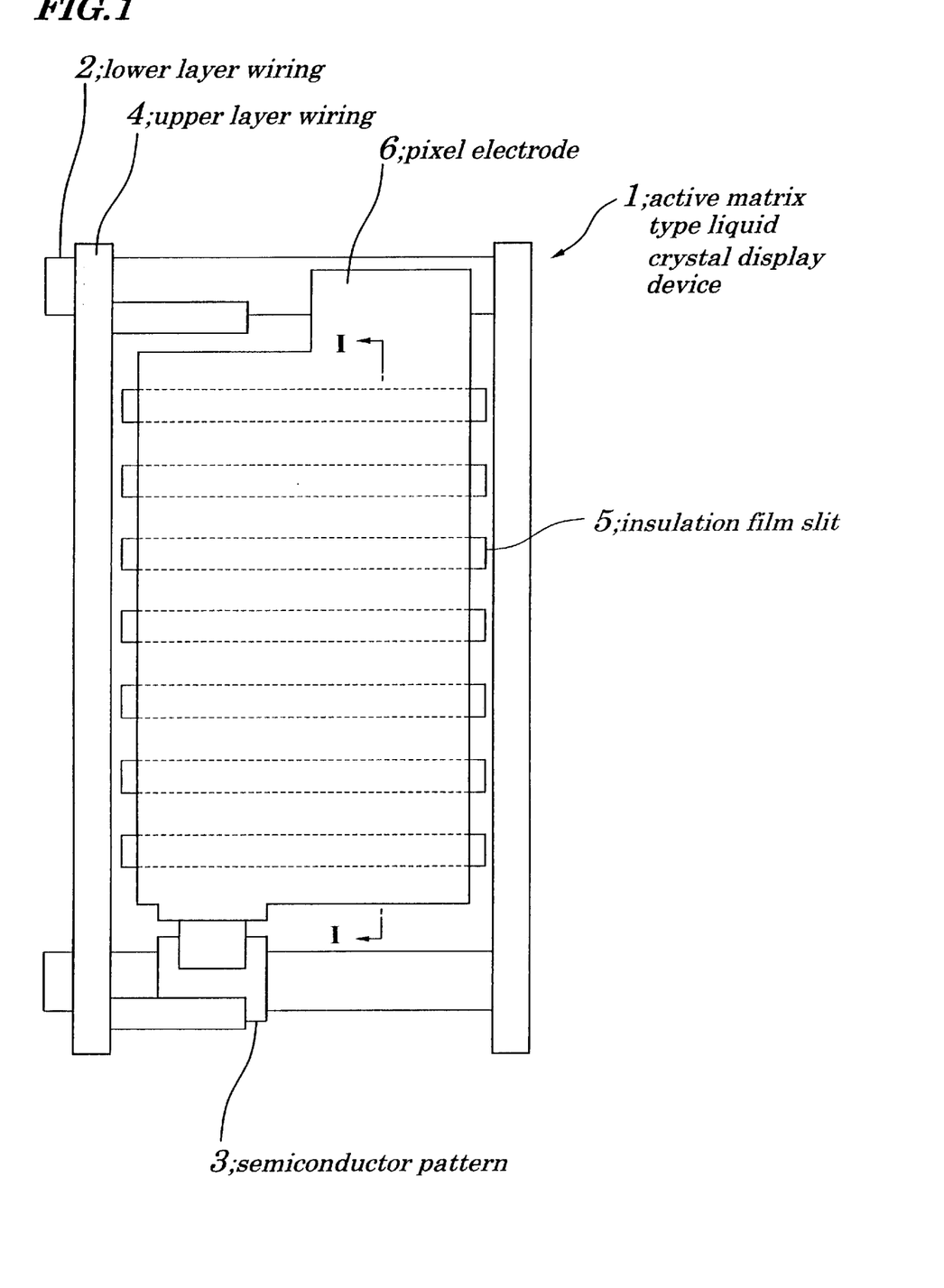
FIG. 1 is a plan view of the active matrix type liquid crystal display device according to a first embodiment of the present invention.
Figure 2:
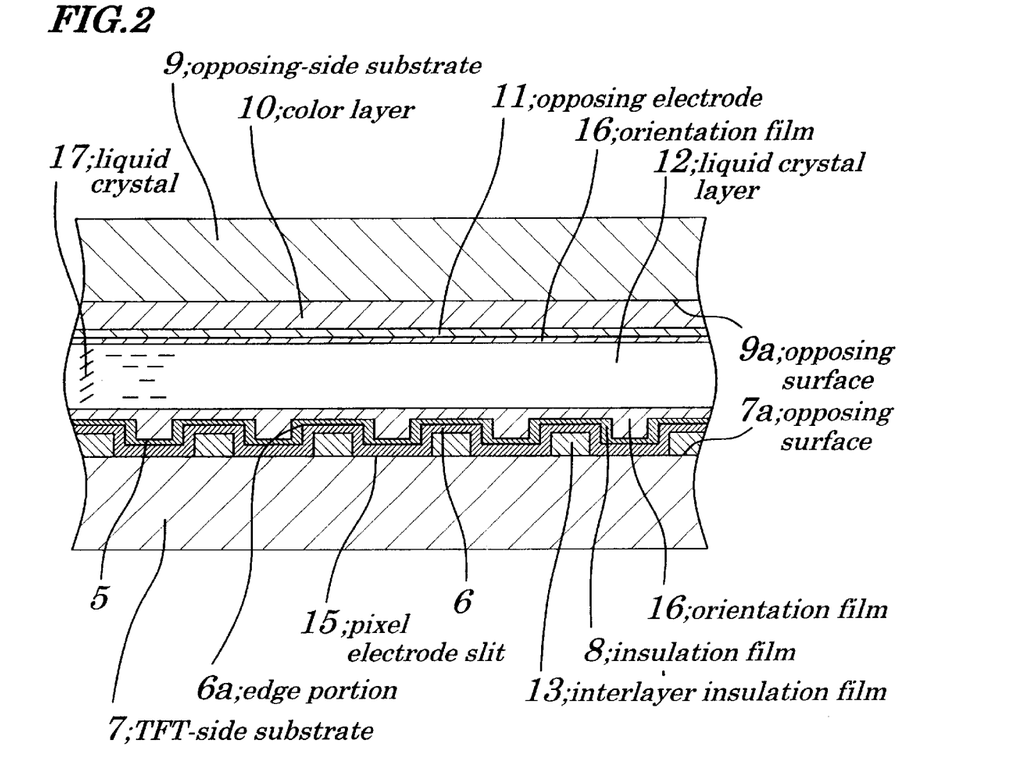
FIG. 2 is a cross-sectional view of the liquid crystal display device, taken along the line I—I of FIG. 1.

FIG. 1 shows a plan view of an active matrix type liquid crystal display device of a first embodiment of the present invention. FIG. 2 shows a cross-sectional view of the liquid crystal display device, taken along the line I—I of FIG. 1.

In the active matrix type liquid crystal display device 1, shown in FIGS. 1 and 2, of the first embodiment of the present invention:

formed on an opposing-side substrate 9 oppositely disposed from a thin-film-transistor-side (i.e., TFT-side) substrate 7 are a color layer 10, opposing electrode 11 and an orientation film 16; formed on the TFT-side substrate 7 is an interlayer insulation film 13 provided with a plurality of insulation film slits 5 each aligned in position with a pixel electrode 6; and, sandwiched between these substrates 7 and 9 is a liquid crystal layer 12 having a liquid crystal which has a negative dielectric anisotropy.

The opposing-side substrate 9 has its opposing surface 9a face the TFT-side substrate 7. Formed on the entire opposing surface 9a of the opposing-side substrate 9 in the order of mention are: a color layer 10; opposing electrode 11 made of a transparent conductive metal; and, an orientation film 16. On the other hand, the TFT-side substrate 7 has its opposing surface 7a face the opposing-side substrate 9. Formed on the entire opposing surface 7a of the TFT-side substrate 7 is the interlayer insulation film 13 provided with a plurality of the insulation film slits 5. The interlayer insulation film 13 has its stepped slits 5 spaced apart from each other at predetermined intervals, wherein each of these stepped slits 5 assumes an island shape formed on the TFT-side substrate 7.

Figure 3:
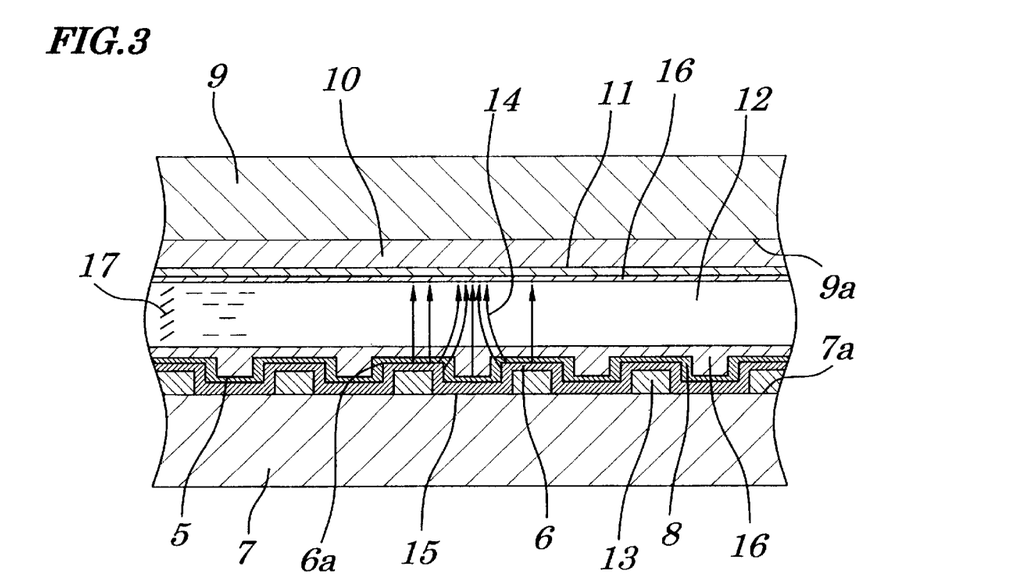
FIG. 3 is a view similar to FIG. 2 but illustrating the directions of electric field vectors in the active matrix type liquid crystal display device of the first embodiment of the present invention shown in FIG. 1.

Formed on both the interlayer insulation film 13 and the TFT-side substrate 7 are: the pixel electrode 6 with an even thickness; and, an insulation film 8. As shown in FIGS. 2 and 3, the pixel electrode 6 assumes a staggered shape in cross section to provide a plurality of the pixel electrode portions 6 each provided with a pair of edge portions 6a, as is clear from FIGS. 2 and 3. On the other hand, the insulation film 8 serves as a transistor (i.e., Tr) protection film. Formed on this insulation film 8 is the orientation film 16. Incidentally, the pixel electrode 6 are electrically connected with a lower layer wiring 2 to have its stepped slit- or island-shaped pixel electrode portions 6 kept at the same potential. On the other hand, the above-mentioned orientation film 16 has been already subjected to an orientation treatment.

Now, a method of forming the active matrix type liquid crystal display device of the first embodiment of the present invention will be described.

As for the opposing-side substrate 9, the opposing electrode 11 made of a transparent conductive metal such as ITO (i.e., Indium Tin Oxide) or the like is formed on the color layer 10 over the entire area of the opposing surface 9a of the opposing-side substrate 9 which has its opposing surface 9a face the TFT-side substrate 7. Then, the orientation film 16 is applied to the entire surface of the opposing electrode 11 to control the liquid crystal molecules of the liquid crystal layer 12 in orientation.

As for the TFT-side substrate 7, the lower layer wiring 2 formed of a metal film made of a suitable metal such as Cr, Al, Mo, or the like is formed on the opposing surface 7a of the TFT-side substrate 7 which has its opposing surface 7a face the opposing-side substrate 7. Then, each of the interlayer insulation film 13 and the semiconductor layer is formed by a so-called P-CVD process. After that, a semiconductor pattern 3 and the insulation film slits 5 are formed through a photo resist process (i.e., PR process). Then, an upper layer wiring 4 formed of a metal film made of a suitable metal such as Cr, Al, Mo, or the like is formed, which is followed by formation of the pixel electrode 6 made of the transparent conductive metal such as ITO (i.e., Indium Tin Oxide) or the like. After that, the insulation film 8 serving as the transistor protection film (i.e., Tr protection film) is formed. Then, the orientation film 16 is applied onto this insulation film 8. After that, the liquid crystal 17 having a negative dielectric anisotropy is sandwiched between the opposing-side substrate 9 and the TFT-side substrate 7, so that the active matrix type liquid crystal display device 1 of this embodiment of the present invention is completed. Incidentally, any one of the orientation films 16 shown in FIGS. 2 and 3 is subjected to an orientation treatment after its application. The remaining process steps in forming the active matrix type liquid crystal display device of the present invention are substantially similar to those of a method of forming a conventional liquid crystal display device of a so-called twisted liquid crystal type (hereinafter referred to as TN type).

Figure 6:
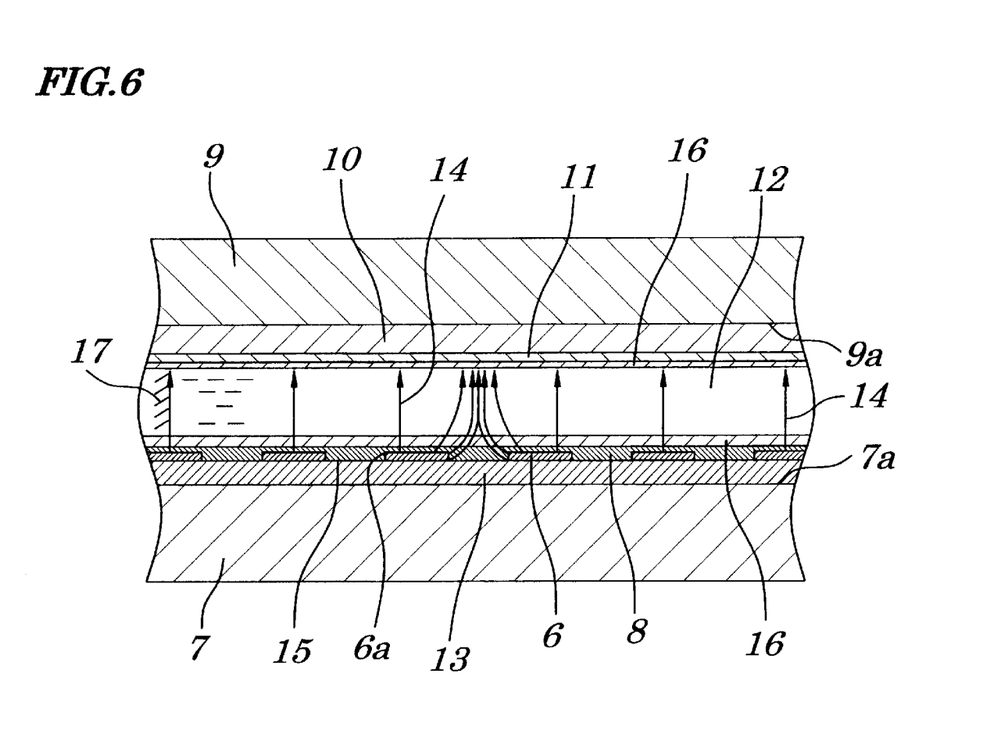
FIG. 6 is a view similar to FIG. 5 but illustrating the directions of electric field vectors in the active matrix type liquid crystal display device of the second embodiment of the present invention shown in FIG. 4.
Figure 7:
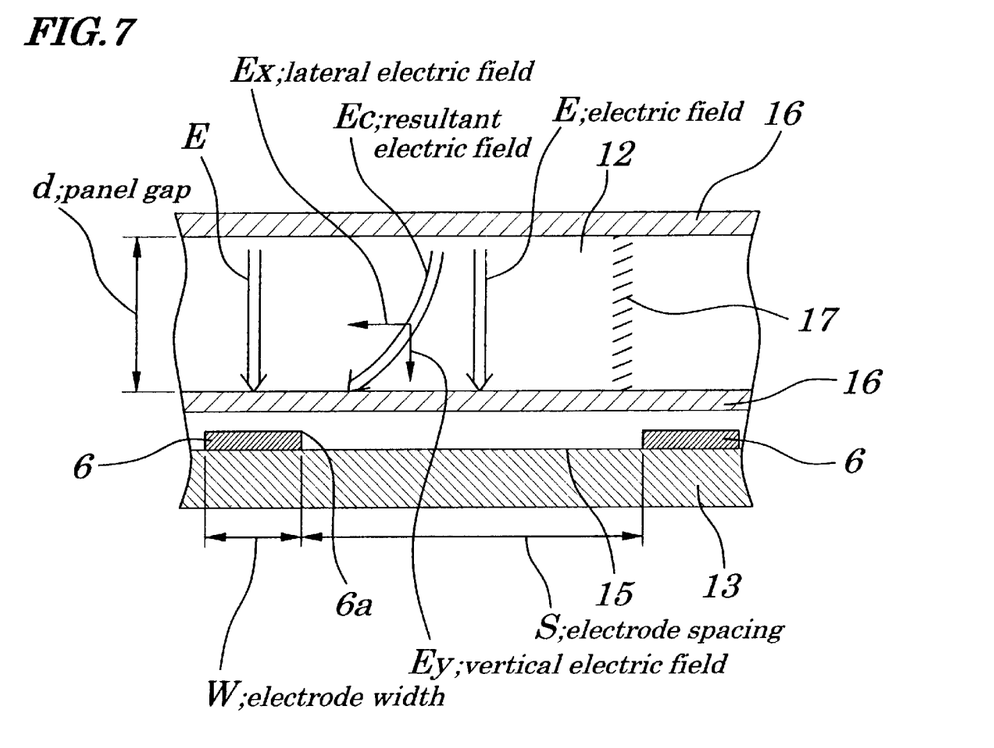
FIG. 7 is an enlarged view of an essential part of the cross-sectional view of FIG. 6, illustrating the directions of electric field vectors in the active matrix type liquid crystal display device of the present invention shown in FIG. 4.
Figure 8:
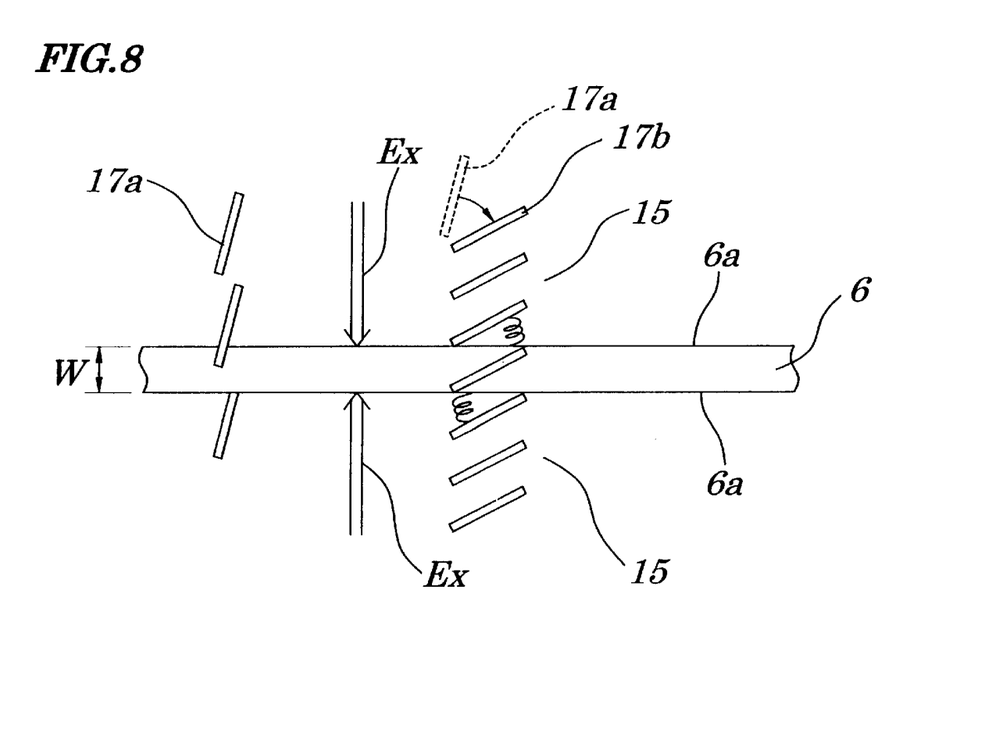
FIG. 8 is a schematic diagram of the liquid crystal in operation in the active matrix type liquid crystal display device of the present invention, illustrating the directions of the electric field vectors and the behavior of the individual liquid crystal molecules in the liquid crystal.

Next, in operation, the first embodiment of the present invention will be described with reference to FIGS. 3, 7 and 8, in which: FIG. 7 shows an enlarged view of an essential part of the cross-sectional view of FIG. 6, illustrating the directions of electric field vectors in the active matrix type liquid crystal display device of the present invention shown in FIG. 4; and, FIG. 8 shows a schematic diagram of the liquid crystal in operation in the active matrix type liquid crystal display device of the present invention, illustrating the directions of the electric field vectors and behavior of individual liquid crystal molecules in the liquid crystal layer 12. Incidentally, in FIG. 8, the orientation film 16 will be omitted for perspicuity.

In the active matrix type liquid crystal display device 1 of the first embodiment of the present invention, when a voltage is applied between the opposing electrode 11 of the opposing-side substrate 9 and the pixel electrode 6 of the TFT-side substrate 7, an electric field E is produced to orient its electric field vectors 14 in the directions of the arrows shown in FIG. 3. In the first embodiment of the present invention, the liquid crystal 17 having a negative dielectric anisotropy is used and oriented in a direction parallel to the substrates 7 and 9. Consequently, the electric field E appearing in a direction perpendicular to the substrates 7 and 9 produces only torque forcing the liquid crystal molecules to lie in a plane parallel to the liquid crystal 17. In other words, the liquid crystal molecules of the liquid crystal 17 move to or turn only in a direction to reduce their pre-tilt angles. Consequently, a display appearing in a screen of a display device of the present invention does not vary.

On the other hand, in each of the edge portions 6a of each of the pixel electrode portions 6 in which the insulation film slit 5 on the side of the TFT-side substrate 7 is formed, in both a vertical electric field Ey and a lateral electric field Ex appear simultaneously, a resultant electric field Ec is produced, as shown in FIG. 7 in which the resultant electric field Ec is oriented in an oblique direction relative to the TFT-side substrate 7. Due to this, the liquid crystal molecules of the liquid crystal 17 are operated under the influence of the lateral component (i.e., lateral electric field Ex) of the resultant electric field Ec. In other words, as is clear from FIG. 8, the liquid crystal molecules of the liquid crystal 17 perform a so-called "In-Plate Switching (i.e., IPS)" operation, in which the liquid crystal molecules of the liquid crystal 17 are turned from their pre-tilt positions 17a to new oriented visible positions 17b in a plane parallel to the TFT-side substrate 7.

In the liquid crystal display device of this first embodiment of the present invention, the opposing electrode 11 and the pixel electrode 6 both made of the transparent metal such as Indium Tin Oxide (i.e., ITO) and like transparent metals are formed over the entire surface of the opposing-side substrate 9 and that of the TFT-side substrate 7, respectively. In effect, since the conductive metal films cover any area affecting the liquid crystal 17 in operation, it is possible for the display device of the present invention to eliminate any shield construction or means, for example such as: a transparent electrode of Indium Tin Oxide (i.e., ITO) and like transparent metals formed behind color filters; a conductive polarizing plate used in behind the color filters; and, like shield means, wherein such shield means are required in the conventional IPS-type (i.e., In-Plate Switching type) liquid crystal display device for shielding an electric field of its liquid crystal from an external electric field.

Further, in the display device of the first embodiment of the present invention, since the opposing-side substrate 9 covers all areas of both the color layer 10 and a black matrix (hereinafter referred to as the BM, which is not shown in the drawings) both of which appear in a display screen of the display device, it is possible to eliminate any overcoat layer, wherein the overcoat layer is made of acrylic resins or the like, and heretofore applied to the opposing-side substrate of the conventional IPS-type liquid crystal display device for shielding its liquid crystal from any substance issued from its color layer and its BM layer made of resins.

Further, in the display device of the first embodiment of the present invention, since all area of the opposing-side substrate 9 appearing in the display screen of the display device is covered by the opposing electrode 11 made of the transparent metal such as ITO (i.e., Indium Tin Oxide) or the like, it is possible to control the liquid crystal 17 by using the opposing electrode 11 through the electric field produced thereby. Consequently, in the display device of the present invention, the BM (not shown) is not required to be made of resins or non-metal materials, wherein the BM made of non-metal materials is heretofore used in the conventional IPS-type or hybrid-type liquid crystal display device in order to not disturb the electric field appearing in its display screen. In other words, in contrast with the conventional IPS-type or hybrid-type liquid crystal display device, it is possible for the display device of the present invention to use the BM made of metals.

Further, in the display device of the first embodiment of the present invention, there is no need for any patterning process on the side of the opposing-side substrate 9, which makes it possible for an overlay process with the side on the TFT-side substrate 7 to be performed with the same accuracy as that of the conventional active matrix type liquid crystal display device of the above-mentioned TN (i.e., twisted liquid crystal) type. As for both the TFT-side substrate 7 and the opposing-side substrate 9, these substrates 7 and 9 may be easily formed by a method of forming the conventional active matrix type liquid crystal display device of the TN type. Consequently, it is possible to form the active matrix type liquid crystal display device 1 of the first embodiment of the present invention by the method of forming the conventional liquid crystal display device of the lateral electric field type. In effect, in forming the active matrix type liquid crystal display device 1 of the present invention, there is no need for any additional method and any installation both being introduced. In other words, since the active matrix type liquid crystal display device 1 of the present invention may be formed by using only the conventional method and apparatus, it is possible for the liquid crystal display device 1 of the present invention to save its manufacturing cost.

SECOND EMBODIMENT

Now, a second embodiment of the present invention will be described with reference to the accompanying drawings.

Figure 4:
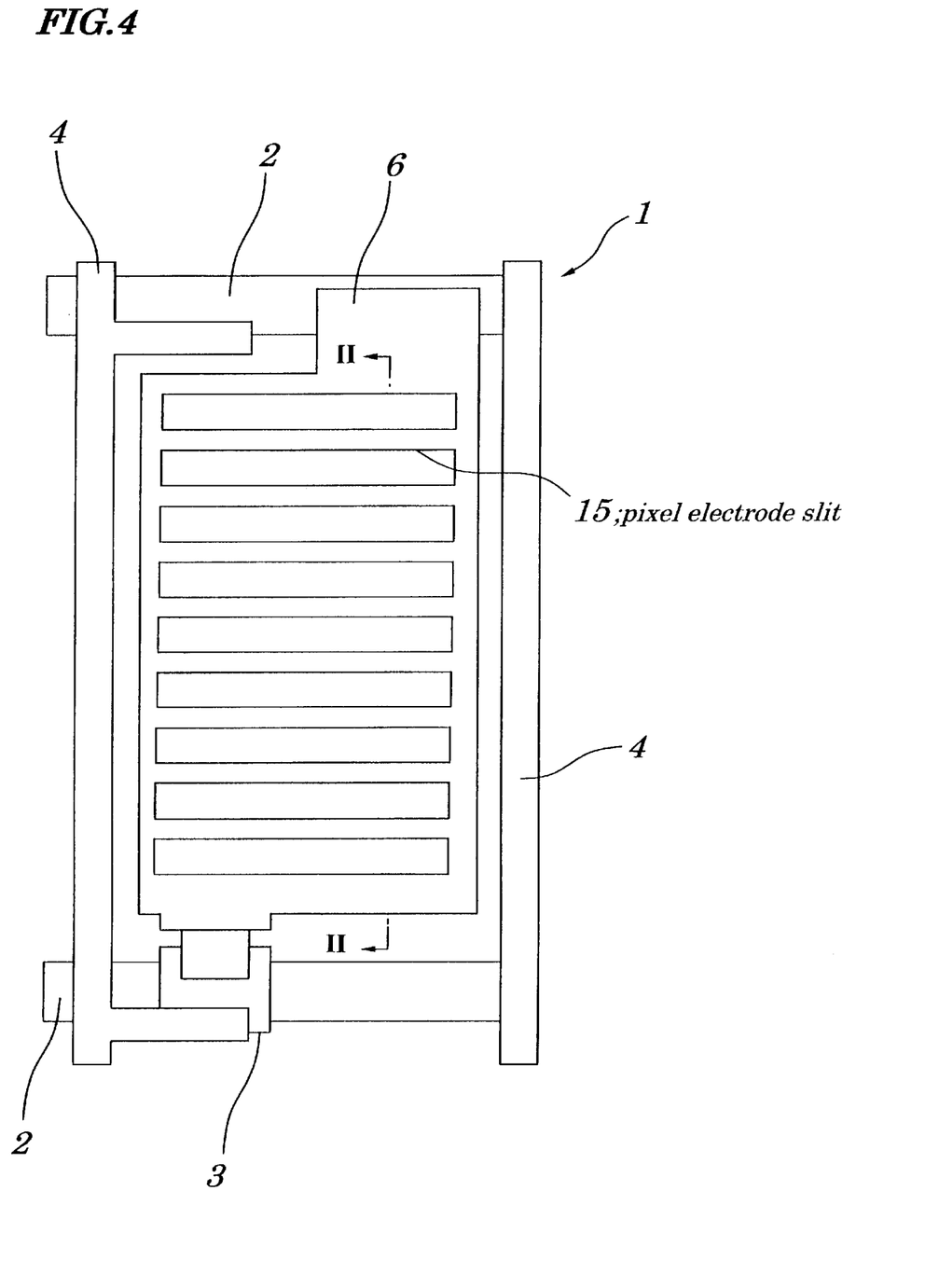
FIG. 4 is a plan of the active matrix type liquid crystal display device of a second embodiment of the present invention.
Figure 5:
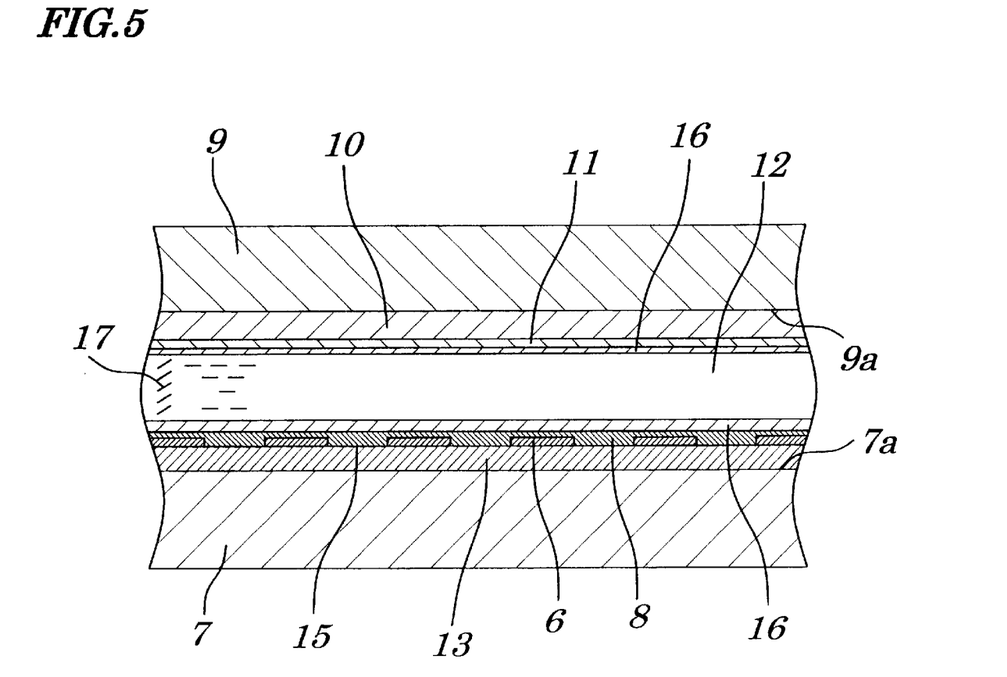
FIG. 5 is a cross-sectional view of the active matrix type liquid crystal display device, taken along the line II—II of FIG. 4.

Incidentally, in the following description and in FIGS. 4 to 6, the parts which are the same as ones employed in the first embodiment shown in FIGS. 1 to 3 have been given the same reference numerals, and, therefore are not further explained. In the drawings:

FIG. 4 shows a plan view of the active matrix type liquid crystal display device of a second embodiment of the present invention; FIG. 5 shows a cross-sectional view of the active matrix type liquid crystal display device, taken along the line II—II of FIG. 4; and, FIG. 6 shows a view similar to FIG. 5 but illustrating the directions of electric field vectors in the active matrix type liquid crystal display device of the second embodiment of the present invention shown in FIG. 4.

In comparison with the first embodiment of the present invention, in the second embodiment of the present invention:

the interlayer insulation film 13 with an even thickness is formed on the TFT-side substrate 7; and, formed on the interlayer insulation film 13 are a plurality of the pixel electrode portions 6 each with an electrode width W, wherein the pixel electrode portions 6 are spaced apart from each other at predetermined intervals (i.e., electrode spacings S), as shown in FIG. 7, so that a plurality of pixel electrode slits 15 shown in FIG. 4 are formed. In other words, these pixel electrode slits 15 each with a slit width S are spaced apart from each other at intervals each equal to the pixel electrode width W. Formed on the pixel electrode portions 6 is the insulation film 8 which has its surface facing the opposing surface 7a of the TFT-side substrate 7 be flat. Further, the pixel electrode 6 has its outer peripheral portion electrically connected in a manner such that the entire area of the pixel electrode 6 is kept at the same potential. Here, it is necessary for the second embodiment of the present invention to satisfy a following Equation (1):

$$W < d \tag{1}$$

where W is the electrode width of each of the pixel electrode portions 6; and, d is a panel gap between the opposing-side substrate 9 and the TFT-side substrate 7.

Further, it is preferable for the second embodiment of the present invention to satisfy a following Equation (2):

$$d < S < 3d \tag{2}$$

where S is each of the electrode spacings of the pixel electrodes 6; and, d is the panel gap between the opposing-side substrate 9 and the TFT-side substrate 7.

Next, with reference to FIGS. 6 to 8, the second embodiment of the present invention will be described in operation. As show in FIG. 6, a lateral electric field Ex (shown in FIG. 7) is produced in the vicinity of each of the edge portions 6a of each pixel electrode 6. In this case, as shown in FIG. 8, when the electrode width W of the pixel electrode 6 is reduced relative to the panel gap "d", the liquid crystal molecules of the liquid crystal 17 disposed on the pixel electrode 6 are rotated in the same direction as that of the liquid crystal molecules disposed in the vicinity of the edge portion 6a of the pixel electrode 6 under the influence of resilient spring forces exerted by the liquid crystal molecules disposed in the vicinity of the edge portion 6a of the pixel electrode 6. Each of the pixel electrodes 6 used in the second embodiment of the present invention is made of a transparent metal as is in the case of the first embodiment of the present invention, and, therefore permits light to pass therethrough, which improves the liquid crystal display device of the present invention in light transmission rate in comparison with the conventional IPS type liquid crystal display device, because the conventional IPS type liquid crystal display device has its electrodes made of the non-transparent metals.

In contrast with the first embodiment of the present invention, in the second embodiment of the present invention, the electrode spacings S of the pixel electrodes 6 are so set as to effectively produce the lateral electric fields. In other words, in the first embodiment, since the pixel electrode 6 is disposed also between adjacent ones of the insulation slits 5, the vertical electric field Ey is stronger than the lateral electric field Ex. Due to this, the liquid crystal molecules of the liquid crystal 17 are pressed against the TFT-side substrate 7, which impairs, in turning torque, these liquid crystal molecules in a plane parallel to the TFT-side substrate 7.

Here, as shown in the Equation (2), in a condition in which the panel gap "d" is smaller than the electrode spacing S (i.e., d<S), it is possible to effectively produce the lateral electric field Ex. However, since the lateral electric field Ex is produced only in the vicinity of the edge portions 6a of each of the pixel electrodes 6, when the electrode spacing S between adjacent ones of the pixel electrodes 6 becomes too large, there is a defect problem that torque resulted from the resilient spring forces of the individual liquid crystal molecules of the liquid crystal 17 fails to cover the entire area of the electrode spacings S of the pixel electrodes 6, which produces an area in which the liquid crystal molecules of the liquid crystal 17 fail to rotate.

Inherently, in a central portion of each of the pixel electrodes 6 made of the transparent metal, the electric field E is produced in a direction perpendicular to the TFT-side substrate 7. Due to this, it is necessary to use the resilient spring forces of the adjacent liquid crystal molecules of the liquid crystal 17 to operate the liquid crystal 17 disposed immediately on each of the pixel electrodes 6. However, when the electrode spacing S becomes too large, since the lateral electric field Ex is effectively produced, a voltage Vtmax required to obtain the maximum value of the light transmission rate is decreased. In view of the above, preferably, the electrode spacing S is so set as to satisfy a following Equation (3):

$$S < 3d \tag{3}$$

where S is each of the electrode spacings of the pixel electrodes 6; and, d is the panel gap between the opposing-side substrate 9 and the TFT-side substrate 7.

Further, in contrast with the conventional IPS type liquid crystal display device in which each of its comb-shaped electrodes is heretofore made of non-transparent metals to impair the display device in light transmission rate, and thereby causing a reduction in the aperture ratio of the conventional display device, in the second embodiment of the present invention:

both the pixel electrodes 6 and the opposing electrode 11 are made of the transparent metals to form the individual transparent electrodes; even the liquid crystal molecules of the liquid crystal 17 disposed immediately on the pixel electrodes 6 are also capable of rotating under the influence of the resilient spring forces exerted by the adjacent ones of the liquid crystal molecules of the liquid crystal 17; and, even each of the pixel electrodes 6 itself permits the light to pass therethrough.

Further, in the second embodiment of the present invention, a plurality of the pixel electrode slits 15 each with a width equal to the electrode spacing S are formed together with the pixel electrodes 6 each with the electrode width W, as shown in FIG. 7. As shown in FIG. 2, formed on the pixel electrodes 6 is the insulation film 8 which has its flat surface face the opposing surface 7a of the TFT-side substrate 7, which facilitates control of orientation of the individual liquid crystal molecules in the liquid crystal 17.

THIRD EMBODIMENT

Now, a third embodiment of the present invention will be described with reference to the accompanying drawings.

Figure 9:
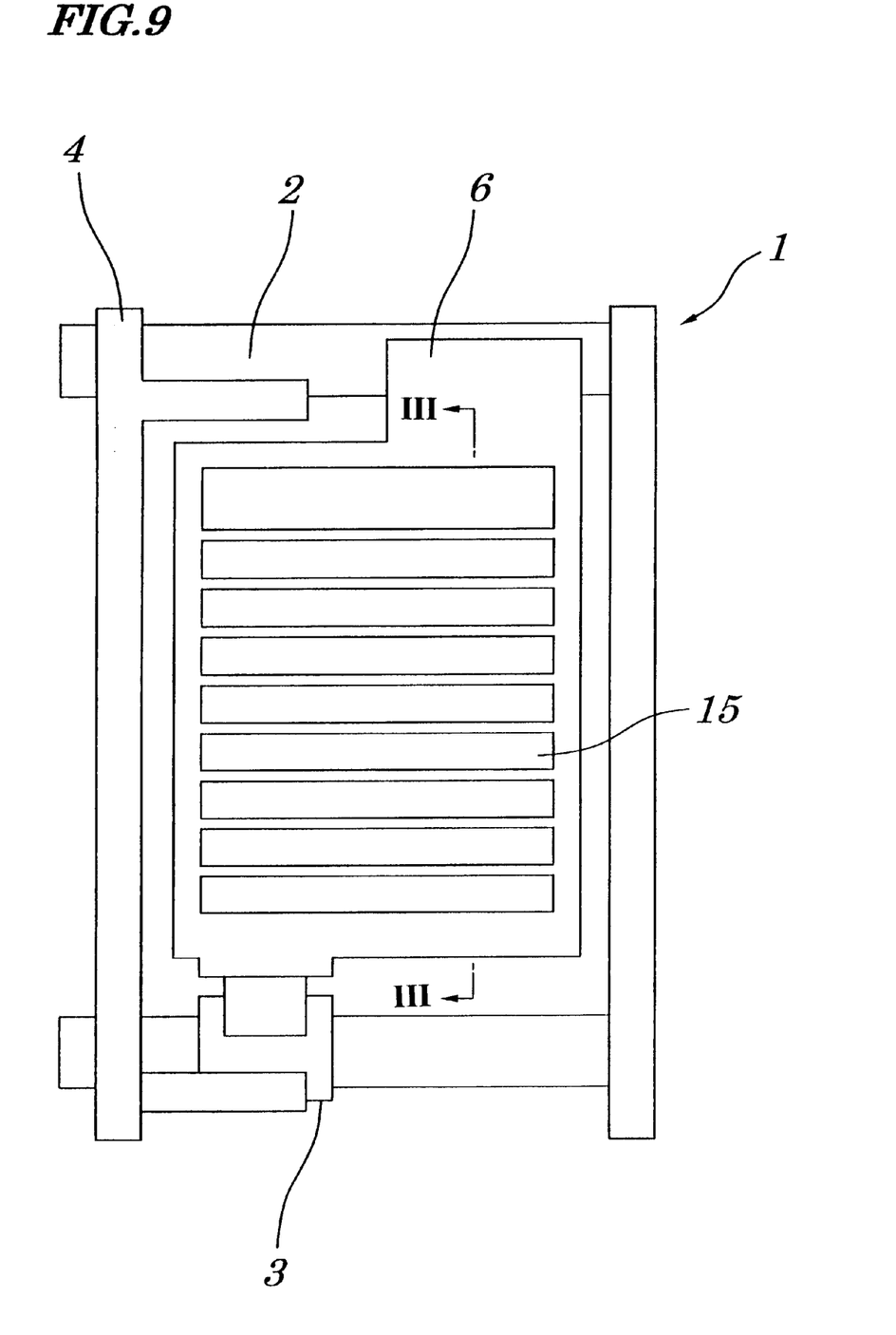
FIG. 9 is a plan view of the active matrix type liquid crystal display device of a third embodiment of the present invention.
Figure 10:
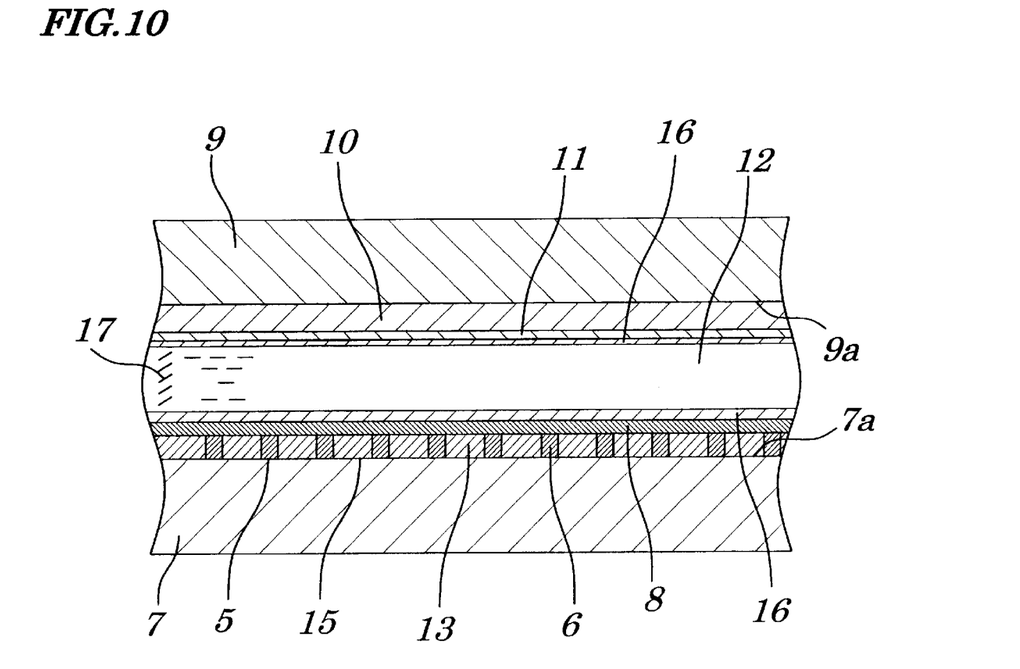
FIG. 10 is a cross-sectional view of the active matrix type liquid crystal display device, taken along the line III—III of FIG. 9.
Figure 11:
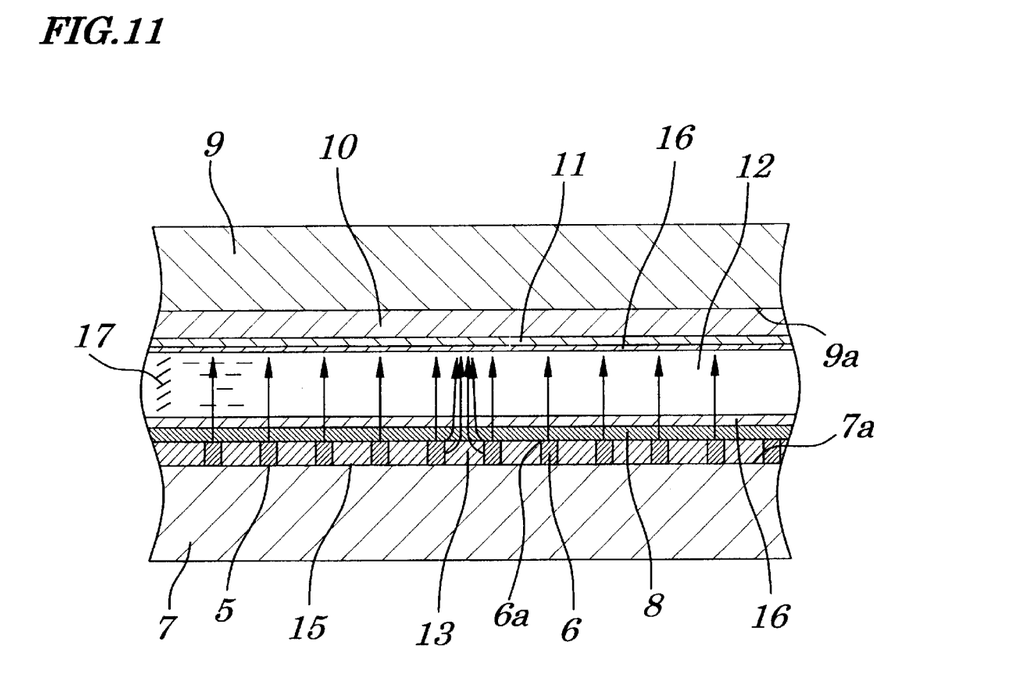
FIG. 11 is a view similar to FIG. 10 but illustrating the directions of electric field vectors in the active matrix type liquid crystal display device of the third embodiment of the present invention shown in FIG. 9.

Incidentally, in the following description and in FIGS. 9 to 11, the parts which are the same as ones employed in the first embodiment shown in FIGS. 1 to 3 have been given the same reference numerals, and, therefore are not further explained. In the drawings: FIG. 9 shows a plan view of the active matrix type liquid crystal display device of a third embodiment of the present invention; FIG. 10 shows a cross-sectional view of the active matrix type liquid crystal display device, taken along the line III—III of FIG. 9; and, FIG. 11 shows a view similar to FIG. 10 but illustrating the directions of electric field vectors in the active matrix type liquid crystal display device of the third embodiment of the present invention shown in FIG. 9.

In comparison with the first embodiment of the present invention, in the third embodiment of the present invention:

a plurality of the insulation film slits 5 are formed in the interlayer insulation film 13; formed in the insulation film slits 5 are the pixel electrodes 6 each of which is capable of being embedded in each of these slits 5 and disposed therein; and, the insulation film 8 formed on both the interlayer insulation film 13 and the pixel electrodes 6 has its flat surface face the opposing surface 7a of the TFT-side substrate 7. As for the remaining construction of the third embodiment of the present invention shown in FIGS. 9 to 11, it is substantially the same as that of the first embodiment of the present invention shown in FIGS. 1 to 3.

In the third embodiment of the present invention, as is in the first and the second embodiment of the present invention:

the lateral electric field Ex is produced in the vicinity of each of the edge portions 6a of the pixel electrodes 6 on the side of the TFT-side substrate 7; and, as shown in FIG. 8, by using the lateral electric field Ex thus produced, it is possible to control the liquid crystal 17 in a manner such that the liquid crystal molecules of the liquid crystal 17 are moved (i.e., turned) from their pre-tilt positions 17a to their visible oriented positions 17b in a plane parallel to the substrate 7. The above lateral turning operation performed by the individual liquid crystal molecules in the liquid crystal 17 is called the IPS operation.

Further, in this third embodiment of the present invention, it is possible to reduce the electrode width W in size by forming the insulation film slits 5 in the interlayer insulation film 13 to embed the pixel electrodes 6 in these insulation film slits 5. Consequently, it is also possible for the present invention to reduce the amount of the liquid crystal 17 disposed immediately on each of the pixel electrodes 6. Therefore, in this third embodiment of the present invention, it is possible to operate or turn without fail even the individual liquid crystal molecules of the liquid crystal 17 disposed immediately on each of the pixel electrodes 6, in comparison with the second embodiment of the present invention.

Further, in this third embodiment of the present invention, as shown in the second embodiment, the pixel electrode 6 may have a slit construction in which each of the pixel electrodes 6 has the electrode width W, and the pixel electrodes 6 are spaced apart from each other at the predetermined intervals (i.e., electrode spacings S).

Furthermore, in this third embodiment of the present invention, the interlayer insulation film 13 with an even thickness is formed on the opposing surface 7a of the TFT-side substrate 7. Then, the pixel electrodes 6 are disposed in the insulation film slits 5 provided in the interlayer insulation film 13, so that the TFT-side substrate 7 is flattened in shape, which makes it easy to control the liquid crystal molecules of the liquid crystal 17 in their orientation.

As described above, in the present invention having the above construction, since the electrodes formed on both the opposing-side substrate and the TFT-side substrate are made of the transparent metals, it is possible for the present invention to improve the active matrix type liquid crystal display device in light transmission rate in comparison with the conventional display device in which the light cannot pass through each of the pixel electrodes. Further, in the display device of the present invention, it is also possible to control the liquid crystal molecules of the liquid crystal by using the lateral electric field.

It is thus apparent that the present invention is not limited to the above embodiments but may be changed and modified without departing from the scope and spirit of the invention.

Finally, the present application claims the Convention Priority based on Japanese Patent Application No. Hei10-284648 filed on Oct. 7, 1998, which is herein incorporated by reference.

What is claimed is:

1. An active matrix type liquid crystal display device comprising:

a TFT-side substrate;

an opposing-side substrate;

an opposing-side substrate oppositely disposed from said TFT-side substrate;

a liquid crystal sandwiched between said TFT-side substrate and said opposing-side substrate;

a transparent conductive electrode formed on an opposing surface of said opposing-side substrate, wherein said opposing surface of said opposing-side substrate, wherein said opposing surface of said opposing-side substrate faces said TFT-side substrate;

a transparent pixel electrode provided with a plurality of pixel electrode portions formed on an opposing surface of said TFT-side substrate, wherein said opposing surface of said TFT-side substrate faces said opposing-side substrate, and said pixel electrode portions each having an electrode width are spaced apart from each other at predetermined electrode spacings; and an insulation film provided with a plurality of slits so that each of said pixel electrode portions is embedded respectively in said slits, wherein said liquid crystal has a negative dielectric anisotropy, and wherein an upper surface of said transparent pixel electrode and an upper surface of said insulation film are coplanar so that said TFT-side substrate has a flat shape.

2. The active matrix type liquid crystal display device according to claim 1, wherein:

$$W < d$$

where W is said electrode width of each of said pixel electrode portions; and, d is a panel gap between said opposing-side substrate and said TFT-side substrate.

3. The active matrix type liquid crystal display device according to claim 1, wherein a panel gap between said opposing-side substrate and said TFT-side substrate is uniform across the liquid crystal display.

4. The active matrix type liquid crystal display device according to claim 1, further comprising:

a second insulation film formed on the pixel electrode.

5. The active matrix type liquid crystal display device according to claim 4, further comprising:

an orientation film formed on the second insulation film.

6. The active matrix type liquid crystal display device according to claim 4, further comprising:

an orientation film having a plurality of protrusions formed between each of said pixel electron portions and a flat side that faces said opposing-side substrate.

7. An active matrix type liquid crystal display device comprising:

a TFT-side substrate;

an opposing-side substrate;

an opposing-side substrate oppositely disposed from said TFT-side substrate;

a liquid crystal sandwiched between said TFT-side substrate and said opposing-side substrate;

a transparent conductive electrode formed on an opposing surface of said opposing-side substrate; wherein said opposing surface of said opposing-side substrate, wherein said opposing surface of said opposing-side substrate faces said TFT-side substrate;

a pixel electrode provided with a plurality of pixel electrode portions having uniform heights formed on an opposing surface of said TFT-side substrate, wherein said opposing surface of said TFT-side substrate faces said opposing-side substrate, and said pixel electrode portions each having an electrode width are spaced apart from each other at predetermined electrode spacings; and an interlayer insulation film provided with a plurality of slits each aligned in positions with each of said pixel electrode portions, wherein said liquid crystal has a negative dielectric anisotropy; wherein $$d < S < 3d$$

where S is each of said electrode spacings of said pixel electrode portions; and, d is a panel gap between said opposing-side substrate and said TFT-side substrate.

8. An active matrix type liquid crystal display device comprising:

a TFT-side substrate;

an opposing side substrate oppositely disposed from said TFT-side substrate;

a liquid crystal sandwiched between said TFT-side substrate and said opposing-side substrate;

a transparent conductive electrode formed on an opposing surface of said opposing side substrate, wherein said opposing surface of said opposing-side substrate faces said TFT-side substrate;

an insulation film provided with a plurality of slits, said insulation film being formed on an opposing surface of said TFT-side substrate, wherein said opposing surface of said TFT-side substrate faces said opposing-side substrate; and a transparent pixel electrode provided with a plurality of pixel electrode portions embedded respectively in said slits of said insulation film, wherein said liquid crystal has a negative dielectric anisotropy; and wherein an upper surface of said transparent pixel electrode and an upper surface of said insulation film are coplanar so that said TFT-side substrate has a flat shape.

9. A method of forming an active matrix type liquid crystal display device, comprising:

sandwiching a liquid crystal between a TFT-side substrate and an opposing-side substrate which is oppositely disposed from said TFT-side substrate;

forming a transparent conductive electrode on an opposing surface of said opposing-side substrate, wherein said opposing surface of said opposing-side substrate faces said TFT-side substrate; and forming both a transparent pixel electrode having a plurality of pixel electrode portions and an insulation film on an opposing surface of said TFT-side substrate, wherein said opposing surface of said TFT-side substrate faces said opposing-side substrate, said insulation film being provided with a plurality of stepped slits so that each of said pixel electrode portions is embedded respectively in said slits, wherein said liquid crystal has a negative dielectric anisotropy, and wherein an upper surface of said transparent pixel electrode and an upper surface of said insulation film are coplanar so that said TFT-side substrate has a flat shape.

10. The method of forming the active matrix type liquid crystal display device, according to claim 9, wherein: said pixel electrode portions are made of a transparent metal capable of permitting light to pass therethrough.

11. The method of forming an active matrix type liquid crystal display device, according to claim 9, wherein a panel gap between said opposing-side substrate and said TFT-side substrate is uniform across the liquid crystal display.

12. A method of forming an active matrix type liquid crystal display device, comprising the steps of:

sandwiching a liquid crystal between a TFT-side substrate and an opposing-side substrate which is oppositely disposed from said TFT-side substrate;

forming a transparent conductive electrode on an opposing surface of said opposing-side substrate, wherein said opposing surface of said opposing-side substrate faces said TFT-side substrate;

forming both a pixel electrode with a plurality of pixel electrode portions and an interlayer insulation film on an opposing surface of said TFT-side substrate, wherein said opposing surface of said TFT-side substrate faces said opposing-side substrate, and said pixel electrode portions each having an electrode width are spaced apart from each other at predetermined electrode spacings to form a pixel electrode slit between adjacent ones of said pixel electrode portions, and said interlayer insulation film is provided with a plurality of stepped slits each aligned in position with each of said pixel electrode portions, wherein said liquid crystal has a negative dielectric anisotropy wherein said pixel electrode portions are made of a transparent metal capable of permitting light to pass therethrough, wherein an upper surface of said pixel electrode and an upper surface of said interlayer insulation film are coplanar so that said TFT-side substrate has a flat shape.

13. A method of forming an active matrix type liquid crystal display device, comprising:

sandwiching a liquid crystal between a TFT-side substrate and an opposing-side substrate which is oppositely disposed from said TFT-side substrate;

forming a transparent conductive electrode on an opposing surface of said opposing-side substrate, wherein said opposing surface of said opposing-side substrate, forming both a transparent pixel electrode having a plurality of pixel electrode portions and an insulation film on an opposing surface of said TFT-side substrate;

wherein said opposing surface of said TFT-side substrate faces said opposing-side substrate, said insulation film is provided with a plurality of insulation film slits, and each of said pixel electrode portions is embedded respectively in each of said insulation film slits, wherein said liquid crystal has a negative dielectric anisotropy, wherein an upper surface of said transparent pixel electrode and an upper surface of said insulation film are coplanar so that said TFT-side substrate has a flat shape.

14. The method of forming the active matrix type liquid crystal display device, according to claim 13, wherein: said pixel electrode portions are made of a transparent metal capable of permitting light to pass therethrough.

* * * * *

UNITED STATES PATENT AND TRADEMARK OFFICE
CERTIFICATE OF CORRECTION

| | |
|---|---|
| PATENT NO. | : 6,441,877 B1 |
| APPLICATION NO. | : 09/413535 |
| DATED | : August 27, 2002 |
| INVENTOR(S) | : Takahiko Watanabe |

It is certified that error appears in the above-identified patent and that said Letters Patent is hereby corrected as shown below:

Title Page Under REFERENCES CITED item (56), under FOREIGN PATENT DOCUMENTS:

Please delete "JP 6-101714" and replace with "JP 3-101714".

Please delete "JP 6-293639" and replace with "JP 3-293639".

In both instances, a "3-" replaces the "6-".

Signed and Sealed this
Twenty-sixth Day of July, 2011

David J. Kappos
*Director of the United States Patent and Trademark Office*